Figure 1:
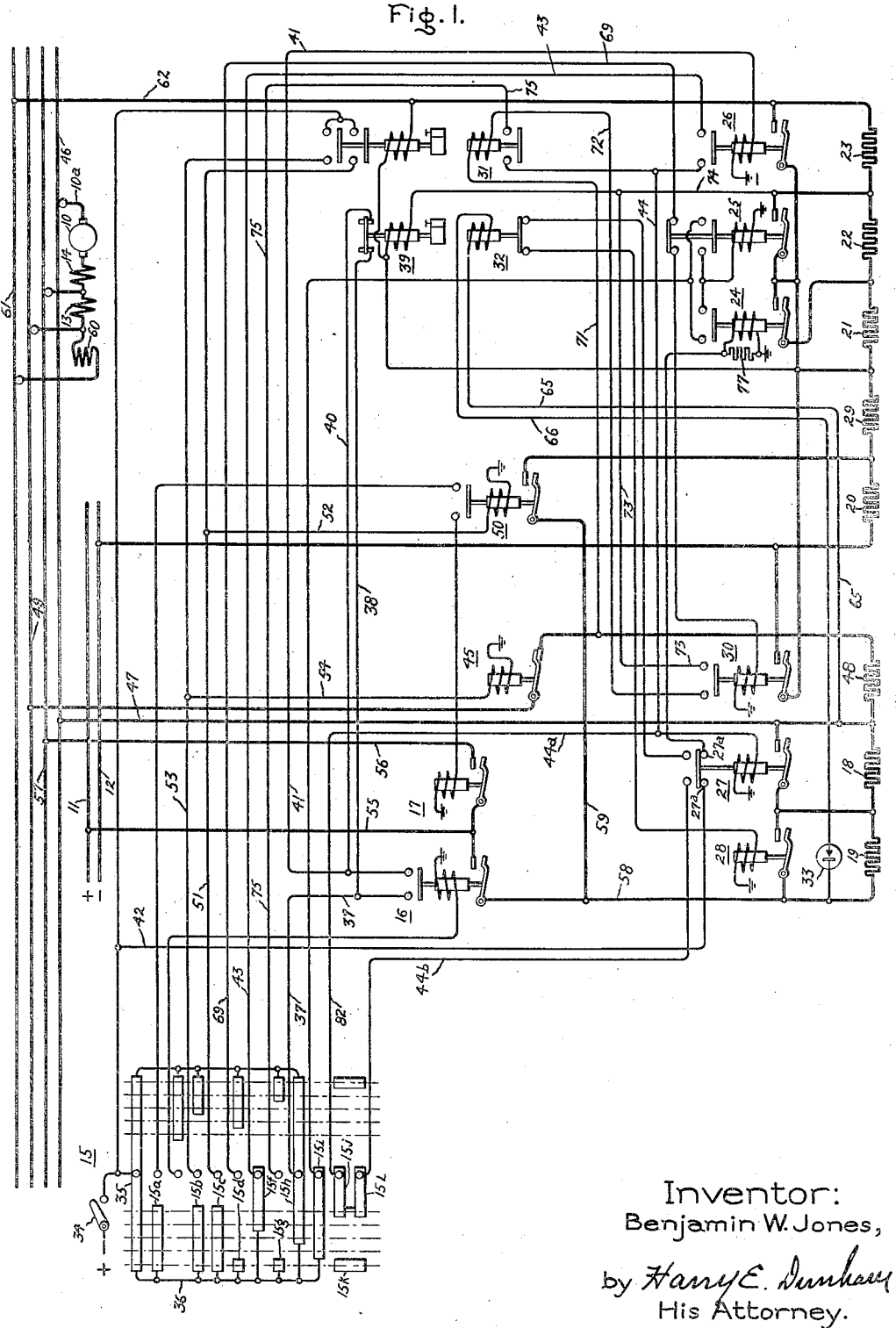

Aug. 2, 1938.  B. W. JONES  2,125,792
CONTROL SYSTEM
Filed Jan. 30, 1937  2 Sheets-Sheet 2

Inventor:
Benjamin W. Jones,
by Harry E. Dunham
His Attorney.

Patented Aug. 2, 1938

2,125,792

UNITED STATES PATENT OFFICE 2,125,792

CONTROL SYSTEM

Benjamin W. Jones, Schenectady, N. Y., assignor to General Electric Company, a corporation of New York Application January 30, 1937, Serial No. 123,217

8 Claims. (Cl. 172—179)

This invention relates to control systems, more particularly to systems for controlling the operation of electric motors, and it has for an object the provision of a simple, reliable, and improved system of this character.

Still more particularly, the invention relates to motor control systems in which the driving motor is required to drive light loads and also heavy loads which at times may overhaul the motor, and a further object of this invention is the provision of means for safely controlling the motor under these conditions.

In hoist installations, there has been a demand for ever increasing speeds of lowering an empty hook, together with good safe regulation in braking the load for loads that overhaul the motor. For example, there have been demands for empty hook lowering speeds ranging from 150% to 250% of normal running speed, together with safe regulation for loads that are of such magnitude as to overhaul the motor. Stated in other words, a fairly flat maximum speed-torque curve for the motor is very desirable for this type of installation. However, certain difficulties are encountered in obtaining this desired operating characteristic. Motor speeds of this order are naturally obtained with the motor operating with a very weak field. Controllers for such installations are usually arranged to insert resistance in the field circuit and to shunt resistance in the armature circuit in predetermined steps. When a motor is operating with a field weakened sufficiently to produce speeds greatly in excess of normal running speed, it is in a very unstable operating condition, and shunting the last section of armature resistance under this condition is very likely to produce bad commutation and even to produce such a surge of current as to result in "flashover".

It is therefore desirable to maintain a section of the armature resistance in circuit when the motor is lowering a load and operating as a motor. This produces a much steeper speed-torque curve in the power lowering quadrant of the motor operation, but does eliminate the danger described in the foregoing.

However, if the load actually overhauls the motor, a steep speed-torque characteristic would be very undesirable, because the speed might rise very quickly to a dangerous value, resulting in damage to the motor and to the apparatus with which the motor is associated. Under this condition of operation, it is desired that the maximum speed-torque curve of the motor shall be as flat as possible in the dynamic braking quadrant of motor operation. In other words, it is desirable that all the motor armature resistance shall be shunted, thereby to produce the most effective braking and thus, even with increasing load, to limit the speed to a safe value. Accordingly, a further object of this invention is the provision of means for producing a moderately steep speed-torque characteristic in the power lowering quadrant of motor operation and a fairly flat speed-torque characteristic in the dynamic braking lowering quadrant of motor operation.

In carrying the invention into effect in one form thereof, a plurality of resistors are connected in the motor armature circuit, and means are provided for shunting these resistors, together with means for preventing the shunting of one of the resistors during motoring operation in one direction, and for shunting this resistor when the load overhauls the motor. In the case of a motor operating a hoist for driving any load acted upon by gravity, these means also provide for shunting this resistor when the motor is hoisting the load, thereby to provide for maximum torque output of the motor.

Figure 2:
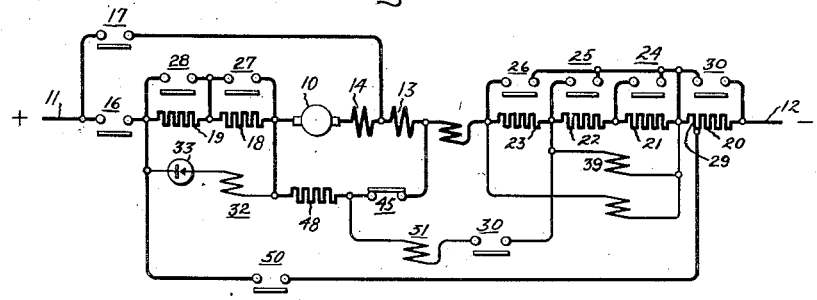
Figure 3:
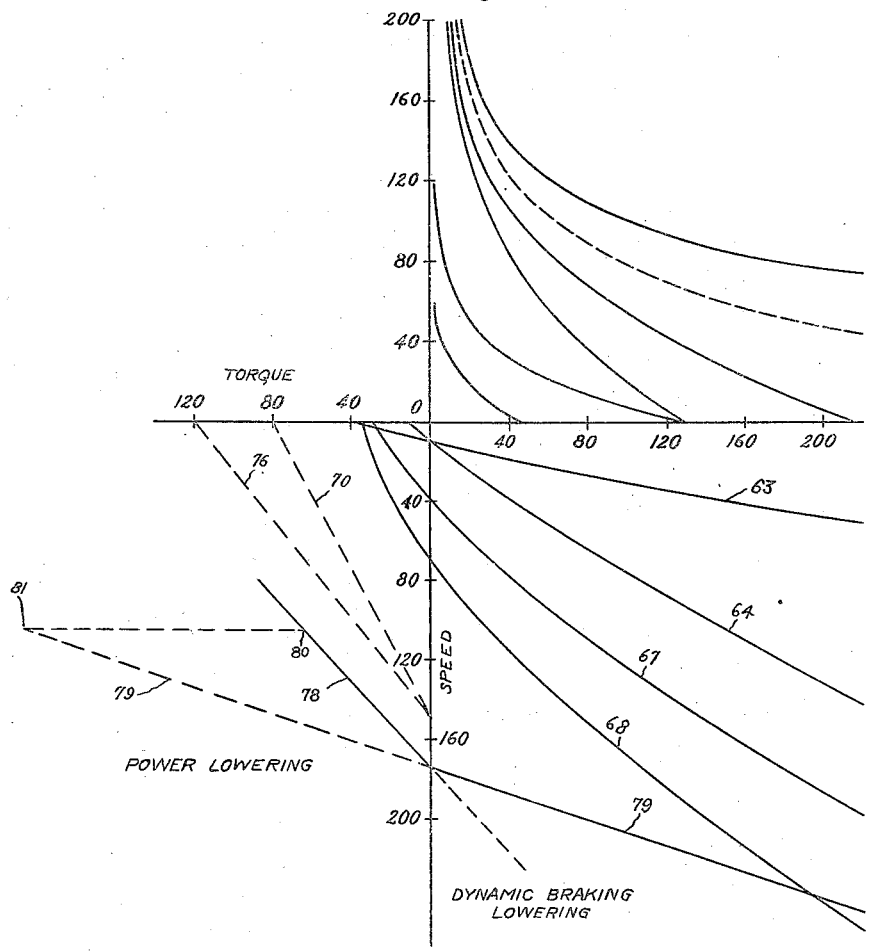

For a better and more complete understanding of the invention, reference should now be had to the following specification and to the accompanying drawings, in which Fig. 1 is a diagrammatical illustration of an embodiment of the invention; Fig. 2 is a simplified diagrammatical illustration in "across the line form" of the embodiment of Fig. 1; and Fig. 3 is a chart of curves representing operating characteristics of the motor, which serve to explain the invention.

Referring now to the drawings, a motor 10, such for example, as a motor utilized to drive a hoist, is supplied from a suitable source represented by the supply lines 11, 12. The motor 10 is illustrated as a series type motor having a series field winding 13 and a commutating field winding 14.

Means are provided for controlling the direction of rotation of the motor. These means are illustrated as a multipoint reversing type master switch 15, and a pair of switching devices 16, 17 under the control of the master switch. The positions on the right-hand side of the master switch are referred to as the hoisting positions, and when the master switch is operated to these positions, the switching device 16, referred to as the hoisting contactor, is closed to connect the armature of the motor 10 to the source for rotation in a direction to hoist the load. Similarly, the positions on the left-hand side of the master switch are the lowering positions and when the master switch is operated to these positions, the lowering contactor 17 is closed to connect the motor 10 to the source for rotation in a direction to lower the load.

Suitable current limiting means illustrated as a plurality of resistors 18, 19, and 20 are included in the armature circuit of the motor for controlling the acceleration and deceleration of the motor. For the purpose of varying the field excitation of the motor, a plurality of resistors 21, 22, and 23 are included in the field circuit of the motor, and the shunting of these resistors is under the control of the electromagnetic contactors 24, 25, and 26, respectively.

Contactors 27 and 28 serve to control the shunting of resistors 18 and 19, respectively. A resistor 29 is at times in the field circuit of the motor and at other times in the armature circuit, depending upon whether its controlling contactor 30 is open or closed.

A relay 31 provides counter voltage control of the contactor 27. This relay is ordinarily adjusted to close its contacts on 25% of normal line volts. A relay 32 having its operating coil connected across the resistors 18 and 19 cooperates with interlock contacts 27a of contactor 27 to control the energization and operation of contactor 28.

In order to prevent the relay 32 from energizing and closing the contactor 28 when the motor 10 is accelerating in the lowering direction, means are provided for energizing the relay 32 and causing it to open its contacts when the motor is accelerating in the lowering direction, and for preventing the relay 32 from opening its contacts if the load should overhaul the motor. These means are illustrated as a rectifier 33 included in the circuit of the operating coil of relay 32. This rectifier may be of any suitable type but it is preferably of the plate surface contact type such, for example, as the well-known copper oxide type of rectifier. Rectifier 33 is so connected in its circuit that it passes current when the motor is driving its load in the lowering direction and does not pass current when it is being overhauled by its load in the lowering direction, or when it is driving the load in the hoisting direction.

With the foregoing understanding of the elements and apparatus and their organization in the system, the operation of the system itself will readily be understood from the following detailed description: The control switch 34 is closed and this completes an energizing circuit for the operating coil of contactor 36 that is readily traced from the positive side of a supply source to power segment 35 of the master switch, conductor 36, segment 15a and cooperating finger, conductors 37 and 38, normally closed contacts of decelerating relay 39, conductors 40 and 41, and operating coil of contactor 26, to the negative side of the source. Contactor 26 closes in response to energization.

Contactor 24 is also energized and closed when the switch 34 is closed. The circuit is readily traced from the switch 34, through conductor 42, normally closed contacts of contactor 27, and operating coil of contactor 24 to the negative side of the source. Contactor 24 in closing completes an energizing circuit for the contactor 25 that is readily traced, and this contactor also closes. Likewise, contactor 27 is energized and closed, and its energizing circuit is readily seen to extend from the conductor 36 of the master switch through segment 15c, conductor 43, interlock of contactor 26, conductor 44 through operating coil of contactor 27 to the negative side of the source. Contactor 27 in closing opens its normally closed interlock to interrupt the energizing circuit of the contactor 24 previously traced through these interlocks, and, accordingly, contactor 24 is again operated to its open position in which it is illustrated. In the closed position of the contactor 27, an energizing circuit is completed for contactor 28 that is traced from the power conductor 36 to the conductor 44, as previously, and thence through conductor 44a, segments 15j and 15L of the master switch, conductor 44b, interlock contacts of contactor 27, normally closed contacts of relay 32, and operating coil of contactor 28 to the negative side of the supply source. Contactor 28 closes in response to energization and shunts the resistor 19. The contacts of dynamic braking contactor 45 are normally held closed either by a spring or by gravity, to complete a loop dynamic braking circuit for the armature of motor 10 that may be seen to extend from the terminal 10a of the motor through trolley wire 46, conductor 47, dynamic braking resistor 48, contacts of dynamic braking contactor 45 to trolley wire 49, and thence through series field 13 and commutating field 14 to the opposite terminal of the motor armature. Thus the apparatus and elements are in the positions described in the foregoing, and the master switch 15 is in the off position when the pilot switch 34 is closed.

Movement of the master switch 15 to the first lowering position completes an energizing circuit for the operating coil of contactor 50 which extends from the power conductor 36 of the master switch through segment 15c and co-operating finger, and thence by conductors 51 and 52, and operating coil of contactor 50 to the negative side of the source. Contactor 50 closes in response to energization and partially completes the armature circuit of motor 10. Simultaneously, an energizing circuit is completed for the operating coil of contactor 45 that is traced from the power conductor 36 of the master switch through segment 15b and co-operating finger, and thence by conductors 53 and 54 to the operating coil of contactor 45 to the negative side of the supply source. As a result, contactor 45 opens its contacts to interrupt the dynamic braking circuit previously traced. Contactor 50 in closing completes an energizing circuit for the operating coil of the lowering contactor 17, and this circuit is seen to extend from the power conductor 36 of the master switch through segment 15a and the interlock contacts of contactor 50, through the operating coil of contactor 17 to the negative side of the supply source. Contactor 17 closes in response to energization, and completes the armature and field circuits for the motor 10. The armature circuit is traced from the positive conductor 11 through conductor 55, contacts of lowering contactor 17, conductor 56, trolley wire 57, commutating field and armature of motor 10, trolley conductor 58, conductor 47, contacts of contactors 27 and 28, conductors 58 and 59, and contacts of contactor 50, and thence through resistor 29 to the negative side of the source. Although the field winding 13 is normally a series field winding, it is connected as a shunt winding for this operating condition, and it will be noted that the shunt path is traced from the junction with the commutating field 14 through the field winding 13 and the series brake winding 60, trolley conductor 61 and conductor 62, contacts of contactor 26, resistors 29 and 20 to the negative side of the supply source.

Thus it will be noted that the motor is connected to the line with the resistor 20 in the armature circuit and the resistors 20 and 29 in the field circuit. Under these conditions, the motor begins to accelerate, and its performance is represented by the characteristic curve 63 of Fig. 3.

It will be understood that it is usual practice for the operator to throw the master switch quickly from the off position to the maximum speed position. However, this operation is described as taking place step by step so that the operation may be more readily visualized and understood.

On the second point of the master switch, the energizing circuit of contactor 28 is interrupted at the segments 15j, 15L of the master switch, and the contactor opens its contact and inserts the resistor 19 in the armature circuit of the motor. Under this condition, the performance of the motor, that is to say, its speed-torque characteristic, is represented by the curve 64 of Fig. 3. When resistor 19 is inserted in the motor circuit, a voltage drop appears across this resistor which causes current to flow through the operating coil of relay 32. This voltage drop is of such a polarity that current will flow through the rectifier 33. The circuit is traced from the right-hand or positive side of the resistor 19 through the contacts of contactor 27, thence through conductor 65, operating coil of relay 32 and conductor 66, rectifier 33 to the left-hand or negative terminal of the resistor. As a result of its energization, relay 32 opens its contacts and further interrupts the energizing circuit of contactor 28 so that it cannot be reclosed as long as current flows through the resistor 19 in the direction from right to left; or in other words, as long as the motor is operating as a motor in the lowering direction.

On the third point of the master switch, the energizing circuit for the operating coil of contactor 27 is interrupted. This energizing circuit was previously traced through the segment 15f of the master switch and the interlock contacts of contactor 26. Contactor 27 opens its contacts and inserts the resistor 18 in the armature circuit of the motor, and the motor continues to accelerate its load in accordance with the speed-torque characteristic represented by the curve 67 of Fig. 3. Contactor 27 in opening, recloses its lower interlock contacts 27a to re-establish the energizing circuit for the operating coil of contactor 24. Contactor 24 closes in response to energization.

On the fourth point of the master switch, the energizing circuit for the operating coil of contactor 26 is interrupted at the segment 15h of the master switch, and the contactor opens its contacts and inserts the resistor 23 in the field circuit of the motor. This causes the motor to accelerate further in accordance with the characteristic represented by the curve 68 of Fig. 4.

As the master switch passes to its fifth position, the energizing circuit for the operating coil of contactor 25 is interrupted at the segment 15i of the master switch, and as a result, contactor 25 opens its contacts and inserts resistor 22 in the field circuit of the motor. At the same time an energizing circuit is completed for the operating coil of contactor 30. This circuit is readily traced from the power conductor 36 of the master switch through segments 15d and co-operating fingers, thence by conductor 69 through upper interlocks of contactor 25 (in the closed position thereof), and operating coil of contactor 30 to the opposite side of the supply source. Contactor 30 closes its contacts in response to energization and connects the resistor 29 in parallel with resistor 20, and at the same time, it connects the field winding 13 to the negative sides 12 of the supply source through the resistors 23 and 22 without passing through resistor 20, so that the motor is now connected to the line in a straight shunt connection, and the motor performances will be in accordance with the curve 70 of Fig. 3.

Contactor 30 in closing completes an energizing circuit for accelerating relay 31. This circuit is traced from the terminals 10a of the motor armature through conductors 46 and 47, resistor 48, conductor 71, operating coil of relay 31, conductor 72, interlock contacts of relay 30, and thence by conductors 73 and 74 to the common terminal of resistors 22 and 23, and thence through resistor 23 to the opposite motor terminal. Relay 31 closes its contact under the influence of the counter voltage of the motor to complete an energizing circuit for contactor 27, provided that the motor speed has become sufficiently high. The energizing circuit for contactor 27 is readily traced from power conductor 36 of the master switch through segment 15g and co-operating finger, thence through conductor 75 and contacts of relay 31, and thence through conductor 44 and the coil of contactor 27 to the negative side of the supply source. As a result, contactor 27 closes its main contacts and shunts the resistor 18 in the armature circuit of the motor, thereby causing it to increase its speed. Under this condition, the motor performance will be in accordance with the speed-torque curve 76 of Fig. 3.

In the closed position of contactor 27, its interlock contact 27a interrupts the energizing circuit of contactor 24. The coil of contactor 24 is short-circuited by a resistance 77, and accordingly, this contact will open its contacts with a slight time delay. Contactor 24 in opening its contacts inserts the resistor 21 in the field circuit of the motor and this produces further acceleration of the motor in accordance with the characteristic curve 78 of Fig. 3.

When contactor 27 closed its contacts, its upper interlock contacts also closed, thereby partially to complete an energizing circuit for the operating coil of contactor 28. However, since the energizing circuit for contactor 28 is maintained open at the contacts of relay 32 as long as the motor is driving its load in the lowering direction, contactor 28 remains open and the resistor 19 remains in the armature circuit of the motor. At this time the motor 10 is operating with a very weak field because the resistors 21, 22, and 23 are all connected in series in the field circuit. If the resistor 19 in the armature circuit of the motor could be short-circuited at this time, the motor performance would be in accordance with the speed-torque curve 79 of Fig. 3. It may now be assumed that at the present point in the operation, the speed and torque of the motor are represented by the point 80 on the speed-torque characteristic 78. Now it will be observed that if the resistor 19 in the armature circuit of the motor should be short-circuited at this point in the operation, the performance of the motor would be suddenly transferred from the point 80 on the characteristic curve 78 to a point 81 on the characteristic curve 79. The point 81 on the curve 79 is readily seen to represent a torque speed of approximately 200%, and since torque and current are similar functions, this would represent a current peak of approximately 200% normal load current. With the motor operating with its field weakened to the extent necessary to produce this speed, such a current peak would be very dangerous and would be very likely to produce flashover of the motor armature.

However, since the rectifier 33 in the operating coil circuit of the relay 32 prevents the contactor 28 from closing as long as the motor is driving its load in the lowering direction, the motor performance continues in accordance with the characteristic represented by the curve 78. It will be noted that curve 78 is a moderately steep curve and consequently, if the load should overhaul the motor, the speed would quickly rise to a dangerous value. Therefore, if the load becomes overhauling, it is desirable that the motor should operate on a flatter characteristic than that represented by the curve 78.

Assuming that the load does overhaul the motor, the current through the armature of the motor will reverse and, consequently, the direction of the current through the resistor 19 will reverse. In other words, the left-hand terminal of the resistor 19 becomes positive and since the rectifier 33 cannot pass current in the reverse direction, the relay 32 becomes de-energized and its contacts close to complete an energizing circuit for the operating coil of contactor 28. This energizing circuit is traced from the power conductor 36 of the master switch through segment 15g and co-operating finger, thence through conductor 75 and contacts of relay 31 in the closed position thereof, conductor 44, conductor 44a, segment 15k of the master switch and co-operating finger, conductor 44b, upper interlock contacts of contactor 27, contacts of relay 32, and operating coil of contactor 28 to the negative side of the supply source. Contactor 28 closes in response to energization and short-circuits the resistor 19. The performance of the motor is now in accordance with curve 79 of Fig. 3 which, it will be observed, is a relatively flat curve. In other words, the speed of the motor increases relatively slowly with increasing load.

Acceleration of the motor in the hoisting direction is somewhat similar to that described for acceleration of the motor in the lowering direction. Because of this similarity a description of the operation in the hoisting direction is unnecessary, further than to state that operating the master switch through its successive positions causes the motor to accelerate, and its performance is in accordance with the characteristic curves illustrated in the upper right-hand quadrant of Fig. 3. However, when the motor is operating in the hoisting direction, the current through the armature of course is in the opposite direction from that in which it flows when the motor is accelerating in the lowering direction. Consequently, the rectifier 33 will not pass current, the relay 32 remains de-energized, and an energizing circuit for the operating coil of contactor 28 can be completed when the master switch is in its fifth hoisting position and the lower interlock of the contactor 27 closed. Thus the resistor 19 can be short-circuited on the fifth point of the master switch in the hoisting direction.

Although in accordance with the provisions of the patent statutes, this invention is described as embodied in concrete form, it will be understood that the apparatus, elements and connections shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system for a motor subject to overhauling loads comprising a plurality of resistors in the armature circuit of said motor, means for shunting said resistors to accelerate said motor, and means responsive to motoring operation of said motor for maintaining one of said resistors effective and responsive to generator action of said motor for shunting said one resistor.

2. A control system for a motor in which the motor drives the load and is overhauled by the load comprising a plurality of resistors connected in the armature circuit of the motor, a plurality of switching devices for shunting said resistors, to effect acceleration of said motor, and means responsive to motoring operation for preventing one of said switching devices from shunting its associated resistor and responsive to overhauling action of the load for shunting said one resistor.

3. A motor control system in which the motor at times operates as a motor and at other times is overhauled by its load, comprising a plurality of resistors in the motor circuit, means for shunting said resistors, and a rectifier connected across one of said resistors for preventing said shunting means from shunting one of said resistors during motoring operation of said motor, and responsive to overhauling operation for controlling said shunting means to shunt said one resistor.

4. A motor control system comprising a plurality of resistors connected in series relationship with the armature circuit of the motor, a plurality of contactors, each for controlling a corresponding resistor, and means responsive to flow of power through said motor in one direction for controlling said contactors so that the variation of the motor speed with load is relatively small and responsive to flow of power in the opposite direction for controlling said contactors so that the variation of motor speed with load is relatively large.

5. A motor control system for hoists and the like in which the motor at times operates as a motor and at other times is overhauled by its load comprising a plurality of resistors in the motor circuit, a plurality of contactors, each for shunting a corresponding resistor, and means responsive to motoring operation of said motor for preventing one of said contactors from shunting its associated resistor and responsive to overhauling operation for controlling said contactor to shunt said resistor comprising a relay having an operating coil connected to be responsive to a voltage drop across a portion of the motor circuit and a rectifier included in the circuit of said coil.

6. A motor control system in which the motor drives the load and at times is overhauled by the load comprising a plurality of resistors connected in the motor armature circuit, a corresponding plurality of contactors, means for controlling said contactors to shunt said resistors in succession, a relay having an operating coil connected to be responsive to the voltage drop across at least one of said resistors for controlling the contactor to be operated last in said succession and a rectifier connected in said coil circuit to prevent said relay from actuating said contactor to shunt said resistor during motoring operation and to provide for operation of said contactor to shunt said resistor when the motor load becomes overhauling.

7. A motor control system for hoists and the like in which the motor drives the load and at times is overhauled thereby comprising a reversible type master switch operable to hoisting and to lowering positions for controlling the direction of rotation of said motor, a plurality of resistors in the armature circuit of said motor, a corresponding plurality of contactors controlled by said master switch for shunting said resistors in succession, and means responsive to motoring operation of said motor in the lowering direction for preventing one of said contactors from shunting its corresponding resistor and responsive to overhauling operation and to motoring operation in the hoisting direction for effecting operation of said contactor to shunt said corresponding resistor.

8. A motor control system for hoists and the like in which the motor drives the load and at times is overhauled thereby comprising a plurality of resistors in the motor armature circuit, a plurality of contactors each for shunting a corresponding one of said resistors, a multi-position reversing type master switch for controlling the operation of said contactors in sequence to shunt said resistors, and means responsive to the direction of current flow in the armature circuit of said motor for preventing operation of one of said contactors from shunting its corresponding resistor during motoring operation in the lowering direction and providing for shunting said resistor when said motor is overhauled by its load and during motoring operation in the hoisting direction said means comprising a rectifier connected across a portion of said armature resistors.

BENJAMIN W. JONES.